(12) United States Patent
Laroia et al.

(10) Patent No.: US 6,816,478 B1
(45) Date of Patent: Nov. 9, 2004

(54) APPARATUS AND METHOD FOR USE IN EFFECTING AUTOMATIC REPEAT REQUESTS IN WIRELESS MULTIPLE ACCESS COMMUNICATIONS SYSTEMS

(75) Inventors: Rajiv Laroia, Basking Ridge, NJ (US); Junyi Li, Matawan, NJ (US); Sathyadev Venkata Uppala, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 595 days.

(21) Appl. No.: 09/706,132

(22) Filed: Nov. 3, 2000

(51) Int. Cl.[7] .................................................. H04J 3/24
(52) U.S. Cl. ....................................................... 370/349
(58) Field of Search ............................... 370/278, 349, 370/437

(56) References Cited

U.S. PATENT DOCUMENTS

| | | | |
|---|---|---|---|
| 5,872,777 A | * | 2/1999 | Brailean et al. ............ 370/349 |
| 6,335,933 B1 | | 1/2002 | Mallory |
| 6,473,399 B1 | | 10/2002 | Johansson et al. |
| 6,496,520 B1 | | 12/2002 | Acosta |
| 6,504,836 B1 | | 1/2003 | Li et al. |
| 6,505,034 B1 | | 1/2003 | Wellig |

OTHER PUBLICATIONS

W. Stallings et al., "Business Data Communications", Third Addition, Pre. Hall, pp. 125–135, 1998.

G. Fairhurst, "Advice to Link Designers on Link Automatic reQuest (ARQ)" Network Working Group, RFC 3366, Aug. 2002.

International Search Report, dated Apr. 17, 2003, received in a PCT application, 5 pages.

* cited by examiner

Primary Examiner—William Cumming

(57) ABSTRACT

In a wireless multiple access communications system a channel resource is managed by utilizing traffic segments and acknowledgment segments to determine if data traffic needs to be retransmitted. traffic data and has a prescribed finite time interval and bandwidth. Each traffic segment in a downlink or an uplink is associated with an acknowledgment segment in the uplink or downlink, respectively, in a fixed one-to-one manner. A base station uses the acknowledgment segments in the downlink to acknowledge the associated traffic segments successfully received in the uplink. A wireless terminal that receives a downlink traffic segment uses the associated acknowledgment segment in the uplink to acknowledge the traffic segment. The base station monitors all the acknowledgment segments to determine whether any of the traffic segments needs to be retransmitted.

59 Claims, 3 Drawing Sheets

APPARATUS AND METHOD FOR USE IN EFFECTING AUTOMATIC REPEAT REQUESTS IN WIRELESS MULTIPLE ACCESS COMMUNICATIONS SYSTEMS

RELATED APPLICATIONS

U.S. patent applications Ser. No. 09/706,377 and Ser. No. 09/706,534 were filed concurrently herewith.

TECHNICAL FIELD

This invention relates to wireless communications systems and, more particularly, to wireless communications between wireless terminals and base stations in a multiple access communications system.

BACKGROUND OF THE INVENTION

Typically, the wireless channel used in a wireless communications system is not as reliable as a wireline channel, because of such channel impairments as multipath fading and Doppler spread. One general technique of improving the wireless channel reliability is to use automatic repeat requests (ARQs). That is, if a received traffic data is detected as having errors, the transmitter will be instructed to retransmit the same traffic data again. When the wireless channel condition and/or interference condition is not completely correlated, retransmission increases the probability of successful traffic reception. One such wireless communications system is the Orthogonal Frequency Division Multiplexing (OFDM) based Spread Spectrum Multiple Access system.

In prior known wireless systems, ARQ is based on exchanging control messages. Specifically, when the receiver detects an error in the received traffic data, it transmits back a control message that includes a request for retransmission of the erroneous traffic data in a control channel dedicated between the transmitter and the receiver. In general, the retransmission request contains the identifier of a corrupted or missed traffic data, such as its sequence number.

Additionally, because the dedicated control channel is also used to convey other control messages, the retransmission request message may have to be inserted into a generic control message format, which may include a greater number of bits than is required by the retransmission request message. Moreover, a specific control message header is typically included for the retransmission request message. Hence, the control message based transmission technique of retransmission requests may take a long time to transmit and cause large overhead, which s very undesirable. As a result, it is generally considered that real-time traffic cannot benefit much from ARQ as the transmission of the retransmission request is not fast enough to meet system deadline requirement.

SUMMARY OF THE INVENTION

These and other problems and limitations of prior known wireless communications system traffic data retransmission arrangements are overcome by managing the channel resource by utilizing traffic segments and acknowledgment segments. This is realized by partitioning the channel resource into an acknowledgment channel and a traffic channel in a fixed manner. The acknowledgment channel includes acknowledgment segments and the traffic channel includes traffic segments. A traffic segment is the basic resource unit to transport traffic data and has a prescribed finite time interval and bandwidth.

Specifically, each traffic segment in the downlink or uplink is associated with an acknowledgment segment in the uplink or downlink, respectively, in a prescribed one-to-one manner. The acknowledgment segment is used to convey the acknowledgment information of the associated traffic segment. When traffic segments are used by different users, the associated acknowledgment segments are also used by different users.

The base station uses the acknowledgment segments in the downlink to acknowledge the associated traffic segments received in the uplink. A wireless terminal that receives a downlink traffic segment uses the associated acknowledgment segment in the uplink to acknowledge the traffic segment. The base station monitors all the acknowledgment segments associated with the traffic segments that the base station has transmitted to determine whether any of the traffic segments needs to be retransmitted. When a wireless terminal has transmitted a traffic segment in the uplink, it monitors the associated acknowledgment segment in the downlink to determine whether the traffic segment needs to be retransmitted.

Advantageously, given the prescribed association, the acknowledgment segment does not specify the resource parameters of the traffic segment, i.e., the slot and waveform set indices, or the identifier of the missed traffic data, such as sequence number. Instead, the essential information to be contained in an acknowledgment segment is just one-bit of information indicating whether the associated traffic has been successfully received. In addition, to facilitate other physical layer functions such as for the transmitter to measure the channel quality, an acknowledgment segment may also include some information of decoding results for the associated traffic segment, such as a measure of the raw error rate.

DETAILED DESCRIPTION

Figure 1:
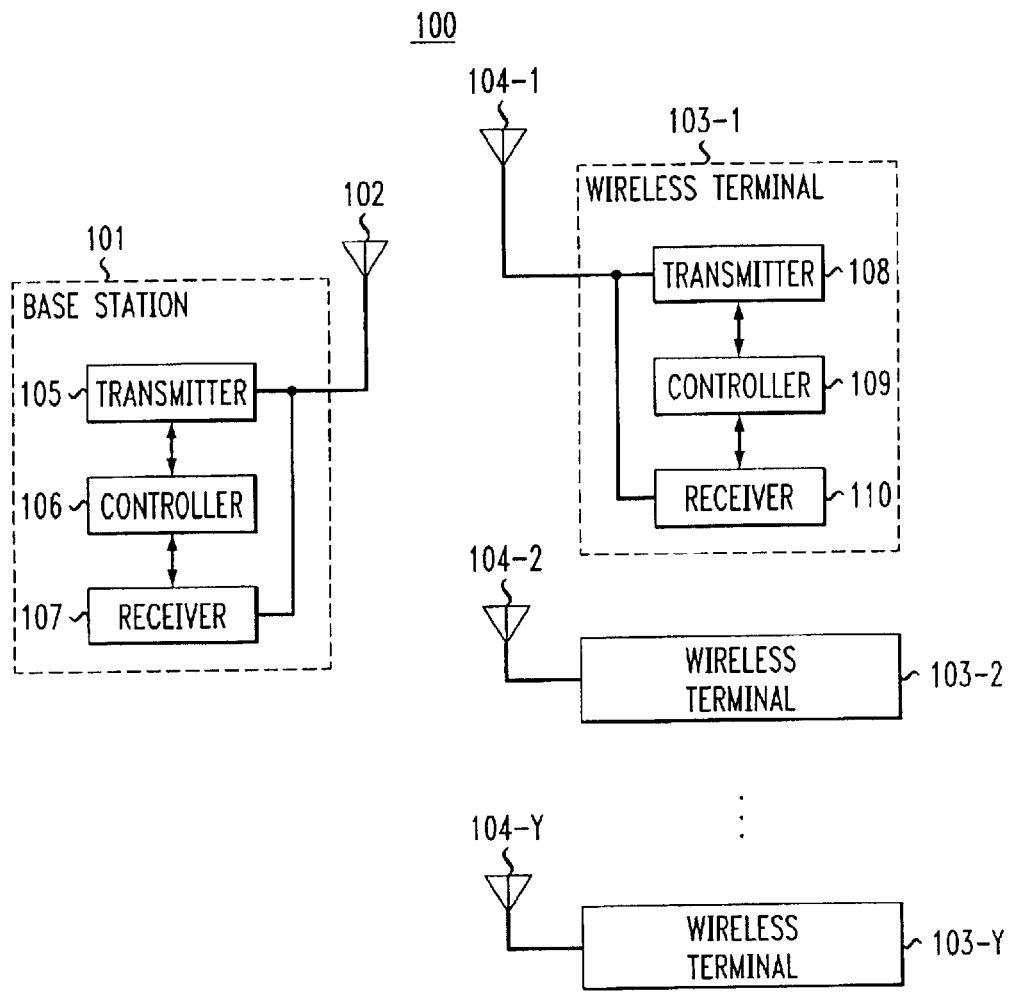
FIG. 1 shows, in simplified block diagram form, a wireless multiple access communications system in which the invention may be advantageously employed.

FIG. 1 shows, in simplified block diagram form, a wireless mobile multiple access communications system in which the invention may be advantageously employed. It should be noted that although applicants' unique invention will be described in the context of a wireless mobile communications system, it has equal application to non-mobile systems. As indicated above, one such mobile wireless communications system is OFDM based spread spectrum multiple access.

More specifically, traffic data is transported via the traffic channel and the traffic channel is allocated dynamically among the wireless terminals. Transported traffic data are to be acknowledged by the receiver rapidly in the invention. This is realized by managing the channel, i.e., bandwidth and time interval, in the form of segments and by acknowledging traffic segments with acknowledgment segments by associating a traffic segment to a particular acknowledgment segment in a prescribed one-to-one manner. It is noted that the downlink and uplink acknowledgment channels are common to all active wireless terminals.

Specifically, shown in FIG. 1 is a mobile multiple access wireless communications system 100. System 100 includes base station 101 including antenna 102 and one or more remote wireless terminals, e.g., mobile units, 103-1, 103-2 through 103-Y including associated antennas 104-1, 104-2 and 104-Y, respectively. Transmission of signals is from and to base station 101 to and from remote wireless terminals 103. All of wireless terminals 103 share the transmission spectrum in a dynamic fashion. The base station 101 uses the acknowledgment segments in the downlink to acknowledge the associated traffic segments received in the uplink. A wireless terminal 103 that receives a downlink traffic segment uses the associated acknowledgment segment in the uplink to acknowledge the traffic segment. The base station 101 monitors all the acknowledgment segments associated with the traffic segments that the base station 101 has transmitted to determine whether any of the traffic segments needs to be retransmitted. When a wireless terminal 103 has transmitted a traffic segment in the uplink, it monitors the associated acknowledgment segment in the downlink to determine whether the traffic segment needs to be retransmitted.

In this example, base station 101 includes transmitter 105, receiver 107 and controller 106 for transmitting and receiving wireless messages via antenna 102. Controller 106 is employed to control operation of transmitter 105 and receiver 107, in accordance with the invention. Similarly, in this example, each of wireless terminals 103-1 through 103-Y includes transmitter 108, receiver 110 and controller 109 for transmitting and receiving wireless messages via antenna 104. Controller 109 is employed to control operation of transmitter 108 and receiver 110, in accordance with the invention.

Figure 2:
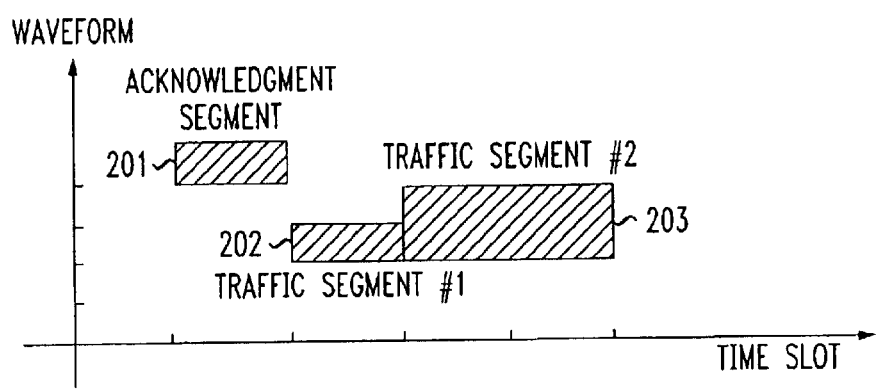
FIG. 2 is a graphical representation illustrating an acknowledgment segment and a number of traffic segments useful in describing the invention.

FIG. 2 illustrates the physical mechanism of managing the channel resource in the form of traffic segments 202 and 203 and an acknowledgment segment 201. The wireless channel resource (bandwidth and time interval) is partitioned into an acknowledgment channel including the acknowledgment segments 201, etc., and a traffic channel including the traffic segments 202, 203, etc. Also shown are time slots. A time slot is a basic time unit and associated with it is a unique time slot index. During any particular time slot there could be a number of waveforms present that are used as the traffic channel. The waveforms may or may not be orthogonal to each other. One or more waveforms are grouped together as a waveform set. Each waveform set has a unique waveform set index. A traffic segment is defined as a combination of prescribed time slot and waveform set indices. In general, a traffic segment contains prescribed waveforms over a prescribed finite time interval.

In a given system, different traffic segments may contain time slots having time intervals of different duration and having waveform sets with different bandwidths. For example, as shown in FIG. 2, traffic segment #1 202 contains one time slot and two waveforms, while segment #2 203 contains two time slots and four waveforms.

All the traffic data between the base station 101 and the wireless terminals 103 is conveyed on traffic segments. A traffic segment is the basic unit of the traffic channel resource. In a wireless system, there are downlink traffic segments and uplink traffic segments. The traffic channel resource is allocated in a form of traffic segment allocation. That is, the base station 101 assigns traffic segments to the wireless terminals 103 in the cell such that the assigned wireless terminals 103 receive traffic in the assigned downlink traffic segments or transmit traffic in the assigned uplink traffic segments.

Acknowledgment information is also conveyed in a form of segments, called acknowledgment segments. Acknowledgment segments are separate from traffic segments. In a wireless system, there are downlink and uplink acknowledgment segments. Downlink acknowledgment segments are transmitted by the base station, and may thus be coded together. However, uplink acknowledgment segments are generally transmitted by different mobiles, and thus cannot be coded together.

Figure 3:
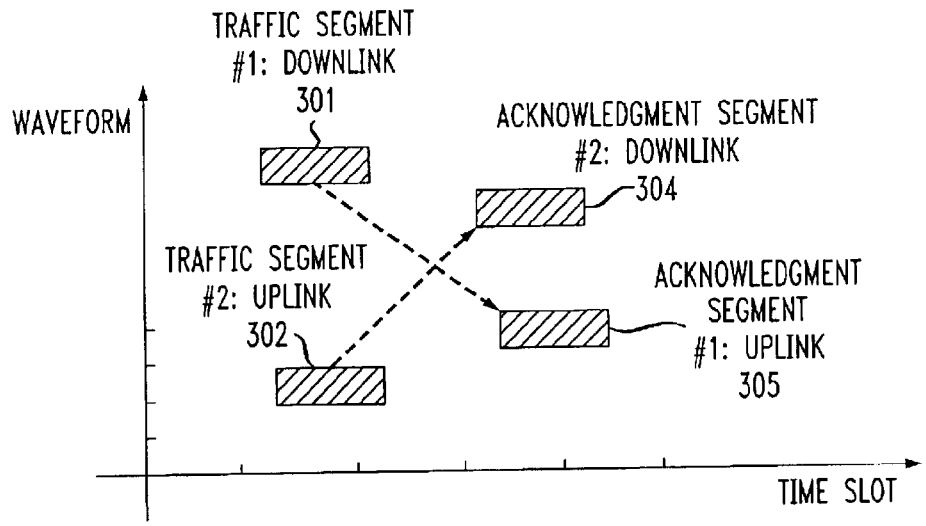
FIG. 3 is a graphical representation illustrating a prescribed relationship between acknowledgment segments and traffic segments also useful in describing the invention.

FIG. 3 is a graphical representation illustrating a prescribed relationship between acknowledgment segments and traffic segments also useful in describing the invention. Thus, as shown, the downlink wireless channel resource (bandwidth and time interval) is partitioned into an acknowledgment channel 304 and a traffic channel 301, among other channels. Similarly, the uplink wireless channel resource (bandwidth and time interval) is partitioned into an acknowledgment channel 305 and a traffic channel 302, among other channels. The partitioning of the traffic channel and the acknowledgment channel in both downlink and uplink is fixed, and the construction of traffic segments and acknowledgment segments is also determined a priori. Each traffic segment in the downlink or uplink is associated with an acknowledgment segment in the uplink or downlink, respectively, in a prescribed one-to-one manner. For example, as shown in FIG. 3 downlink traffic segment #1 301 is associated with uplink acknowledgment segment #1 305, and uplink traffic segment #2 302 is associated with downlink acknowledgment segment #2 304.

An acknowledgment segment, e.g., 304 or 305, is used to convey the acknowledgment information of the associated traffic segment, e.g., 302 or 301, respectively. Therefore, an acknowledgment segment cannot precede the associated traffic segment. The delay interval from the traffic segment to the associated acknowledgment segment reflects the time the receiver, e.g., 107 or 110, takes to decode the traffic segment and that an associated transmitter, e.g., 105 or 108, takes to prepare to transmit the acknowledgment. In a preferred embodiment, the delay should be selected to be the minimum value that can be allowed by the processing capability of base stations and wireless terminals that are supported in a particular system.

The fact that the association of a traffic segment, e.g., 301 or 302, and an acknowledgment segment, e.g., 305 or 304, respectively, is determined in a prescribed manner allows that the acknowledgment segment does not necessarily include the resource parameters of the associated traffic segment, i.e., the time slot and waveform set indices, or the identifier of the missed traffic data, such as sequence number. In turn, this significantly reduces the overhead in transmitting acknowledgment segments. The essential information to be contained in an acknowledgment segment is just one-bit of information indicating whether the associated traffic data has been successfully received. Additionally, to facilitate other physical layer functions, such as the transmitter measuring the channel quality, an acknowledgment segment may also include some information regarding decoding results for the associated traffic segment, such as the estimate of raw error rate. By allocating an appropriate amount of channel resource, e.g., bandwidth and/or time interval, and/or transmission power, to acknowledgment segments, reliability of the ARQ can be ensured.

Figure 4A:
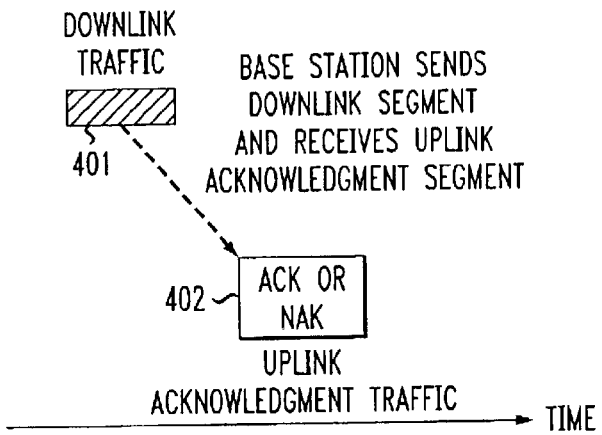
FIG. 4A is a graphical representation illustrating the logical flow of acknowledging traffic segments transmitted in the downlink by the base station also useful in describing the invention.

FIG. 4A is a graphical representation illustrating the logical flow of acknowledging traffic segments transmitted in the downlink by the base station 101. For each transmitted downlink traffic segment 401, the base station 101 receives the associated acknowledgment segment 402 in the uplink to determine whether the traffic segment needs to be retransmitted. Similarly, a wireless terminal 103 that receives a downlink traffic segment transmits the associated acknowledgment segment in the uplink to acknowledge the traffic segment.

Figure 4B:
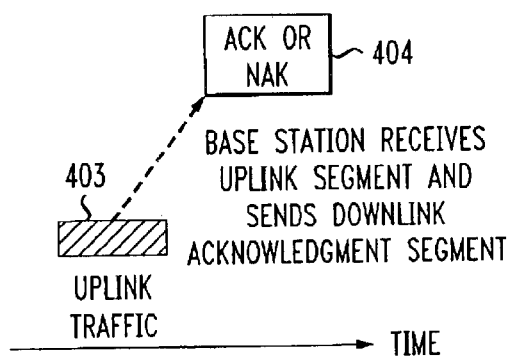
FIG. 4B is a graphical representation illustrating the logical flow of acknowledging traffic segments received in the uplink by the base station also useful in describing the invention.

FIG. 4B is a graphical representation illustrating the logical flow of acknowledging traffic segments received in the uplink by the base station 101. For each received uplink traffic segment 403, the base station 101 transmits the associated acknowledgment segment 404 in the downlink to acknowledge the uplink traffic segment 403. When a wireless terminal 103 has transmitted a traffic segment in the uplink, it monitors the associated acknowledgment segment in the downlink to determine whether the traffic segment needs to be retransmitted.

In this example, a positive acknowledgment (ACK) indicates that the associated traffic segment does not have to be retransmitted, while a negative acknowledgment (NAK) indicates that the associated traffic segment needs to be retransmitted. More specifically, the one-bit of information includes a first logical state and a second logical state. In this example, the first logical state is a logical 1 indicating the positive acknowledgment and the second logical state is a logical 0 indicating the negative acknowledgment.

The segment based ARQ scheme in accordance with the invention is fundamentally different from the existing form of the message based ARQ scheme in that acknowledgment information can be feed back very rapidly, thereby facilitating fast ARQ. Note that the delay between a traffic segment,to the associated acknowledgment segment is mainly limited by the processing capability of the receiver, which is significantly less than the delay in the message based ARQ scheme. Additionally, as the acknowledgment segments only transport essentially one-bit of information, the acknowledgment overhead is very small. Unlike the existing ARQ technique where the acknowledgment message is transported in a control channel resource dedicated to a wireless terminal, according to the invention, the acknowledgment segments are shared by many wireless terminals 103 in the sense that when traffic segments are used by different users, the associated acknowledgment segments are also used by different users. That is, the acknowledgment channel is common to all active wireless terminal. Note that sharing the acknowledgment channel in accordance with an aspect of the invention does not cause any problem of collision.

Figure 5:
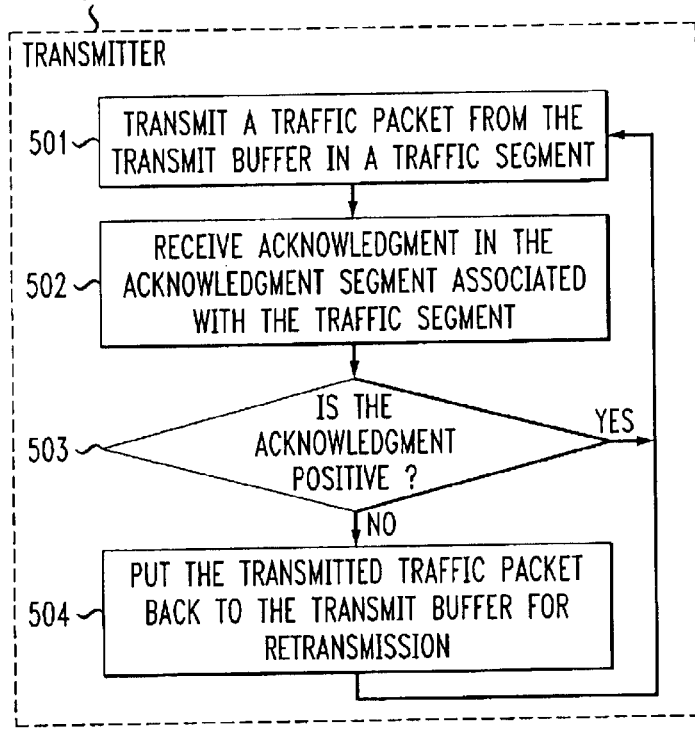
FIG. 5 is a flowchart illustrating steps in a transmitter process for determining whether to retransmit the traffic data in accordance with the invention.

FIG. 5 is a flowchart illustrating steps in a transmitter process for determining whether to retransmit the traffic data in accordance with the invention. The transmitter process is started in step 501 which causes a traffic packet of data to be transmitted from a transmit buffer in a traffic segment. Therefore, for downlink traffic, the transmitter is the base station 105, and for uplink traffic, the transmitter is a wireless terminal 108. Then, in step 502 an acknowledgment is received in the acknowledgment segment associated with the transmitted traffic segment. Step 503 tests to determine if the received acknowledgment is a positive acknowledgment. Again, if the received acknowledgment is positive the traffic segment does not have to be retransmitted. Therefore, if the test result in step 503 is YES, a positive acknowledgment has been received and control is returned to step 501. Steps 501 through 503 are iterated until step 503 yields a NO result indicating that a negative acknowledgment has been received and retransmission of the associated traffic segment is required. Then, step 504 causes the transmitted traffic packet to be placed back into the transmit buffer for retransmission, and control is transferred to step 501. Thereafter, appropriate ones of steps 501 through 504 are iterated.

Figure 6:
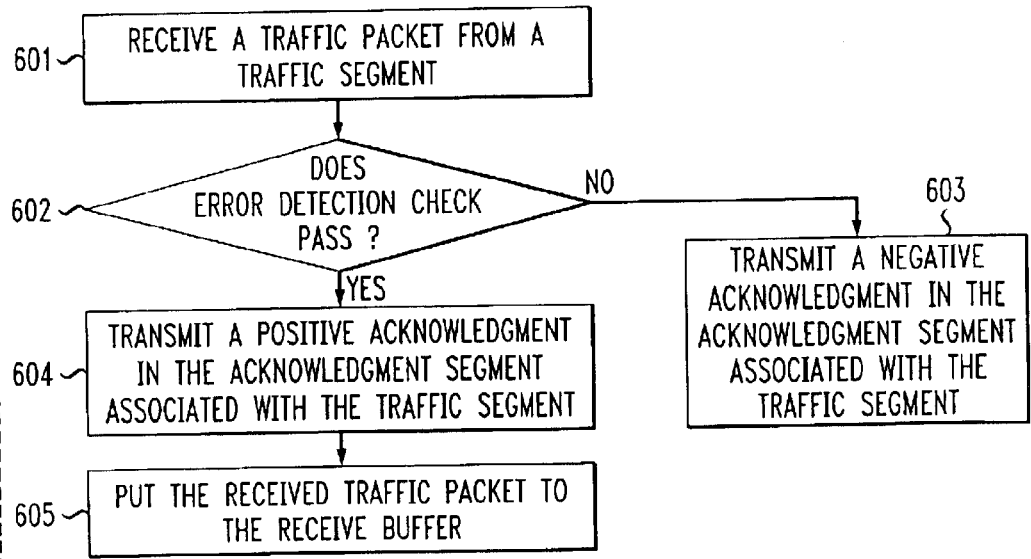
FIG. 6 is a flowchart illustrating steps in a receiver process for determining whether or not to transmit a retransmission request in accordance with the invention.

FIG. 6 is a flowchart illustrating steps in a receiver process for determining whether or not to transmit a retransmission request in accordance with the invention. The receive process is started in step 601, in which a traffic packet is received from a traffic segment. Therefore, for downlink traffic, the receiver is a wireless terminal 110, and for uplink traffic, the transmitter is the base station 107. Then, step 602 tests to determine if an error detection check of the data packet has been passed. If the test result in step 602 is NO, control is transferred to step 603. In turn, step 603 causes the transmission of a negative acknowledgment in the acknowledgment segment associated with the traffic segment that transported the traffic packet that failed the error detection, check in step 602. If the test result in step 602 is YES, the error detection check of the traffic packet data has passed. Then, step 604 causes a positive acknowledgment to be transmitted in the acknowledgment segment associated with the traffic segment. Thereafter, step 605 causes the received traffic packet data to be placed in a receive buffer.

The above-described embodiments are, of course, merely illustrative of the principles of the invention. Indeed, numerous other methods or apparatus may be devised by those skilled in the art without departing from the spirit and scope of the invention. Moreover, the invention may be implemented as hardware, as an integrated circuit, via programming on a microprocessor, on a digital signal processor or the like.

What is claimed is:

1. A method for use in a wireless communications system comprising at least one base station and at least one wireless terminal and which communicate via downlink and uplink wireless channel resources comprising the steps of:

partitioning said wireless channel resource into at least an acknowledgment channel including one or more acknowledgment segments and a traffic channel including one or more traffic segments;

associating each of said acknowledgment segments with said traffic segments in a fixed one-to-one manner;

transmitting traffic data in a traffic segment; and receiving an acknowledgment in an acknowledgment segment associated with said traffic segment transporting said traffic data, wherein said acknowledgment includes at least one logical bit of information indicating whether or not said traffic data has been successfully received.

2. The method as defined in claim 1 wherein said association of said acknowledgment segments and said traffic segments includes the acknowledgment segment having a prescribed delay interval relative to an associated traffic segment wherein said delay interval is greater than zero.

3. The method as defined in claim 1 wherein said acknowledgment segments transport additional information relating to said associated traffic segments.

4. The method as defined in claim 1 wherein said acknowledgment consists of one logical bit.

5. The method as defined in claim 1 wherein said step of receiving includes a step of detecting a logical state of said at least one logical bit of information to determine whether said traffic data has been successfully received.

6. The method as defined in claim 5 wherein said logical bit of information has a first logical state indicating that said traffic data has not been successfully received and a second logical state indicating that said traffic data has been successfully received.

7. The method as defined in claim 1 wherein each of said traffic segments has a prescribed finite time interval and bandwidth, and wherein each of said acknowledgment segments has a prescribed finite time interval and bandwidth.

8. A method for use in a wireless communications system comprising at least one base station and at least one wireless terminal which communicate via downlink and uplink wireless channel resources comprising the steps of:
    partitioning said wireless channel resources into at least an acknowledgment channel including one or more acknowledgment segments and a traffic channel including one or more traffic segments;
    associating each of said acknowledgment segments with said traffic segments in a fixed one-to-one manner;
    receiving traffic data in a traffic segment; and
    determining whether said received traffic data passes a prescribed error test,
    in response to results of said error test, transmitting an acknowledgment in the acknowledgment segment associated with said traffic segment that transported said traffic data,
    wherein said acknowledgment includes at least one logical bit of information indicating whether or not said error test has been passed.

9. The method as defined in claim 8 wherein said association of said acknowledgment segments and said traffic segments includes the acknowledgment segment having a prescribed delay interval relative to an associated traffic segment, wherein said delay interval is greater than zero.

10. The method as defined in claim 8 wherein said acknowledgment segments transport additional information relating to said associated traffic segments.

11. The method as defined in claim 8 wherein said step of transmitting includes a step of determining a logical state of said at least one logical bit of information to indicate whether said traffic data has been successfully received.

12. The method as defined in claim 11 wherein said logical bit of information has a first logical state indicating that said traffic data has not been successfully received and a second logical state indicating that said traffic data has been successfully received.

13. Apparatus for a wireless communications system comprising at least one base station and at least one wireless terminal and which communicate via downlink and unlink wireless channel resource comprising:
    a partitioner for partitioning said wireless channel resource into at least an acknowledgment channel including one or more acknowledgment segments and a traffic channel including one or more traffic segments, and for associating each of said acknowledgment segments with each of said traffic segments in a fixed one-to-one manner;
    a transmitter for transmitting traffic data in a traffic segment; and
    a receiver for receiving an acknowledgment in an acknowledgment segment associated on a one-to-one basis with said traffic segment transporting said traffic data, wherein said acknowledgment includes at least one logical bit of information indicating whether or not said traffic data has been successfully received.

14. The apparatus as defined in claim 13 wherein said association of said acknowledgment segments and said traffic segments includes the acknowledgment segment having a prescribed delay interval relative to an associated traffic segment, wherein said delay interval is greater than zero.

15. The apparatus as defined in claim 13 wherein said acknowledgment segments transport additional information relating to said associated traffic segments.

16. The apparatus as defined in claim 13 further includes
    a detector for determining whether said received acknowledgment indicates that the traffic data is to be retransmitted, said determination to retransmit said traffic data being made from said at least one logical bit; and
    said transmitter being controlled in response to the results of said determination to retransmit said traffic data in said traffic segment when said determination so indicates.

17. The apparatus as defined in claim 16 wherein said detector detects a logical state of said at least one logical bit of information to determine whether said traffic data has been successfully received.

18. The apparatus as defined in claim 17 wherein said logical bit of information has a first logical state indicating that said traffic data has been successfully received and a second logical state indicating that said traffic data has not been successfully received.

19. The apparatus as defined in claim 13 wherein each of said acknowledgment segments has a prescribed finite time interval and bandwidth, and wherein each of said traffic segments has a finite time interval and bandwidth.

20. The apparatus as defined in claim 14 wherein in said base station said transmitter transmits a traffic segment on said downlink wireless channel resource and said receiver receives an acknowledgment segment on said uplink wireless channel resource, said base station further includes an allocator for dynamically said downlink traffic segments to said wireless terminals, and in said base station said transmitter transmits a downlink traffic segment to a particular wireless terminal if said allocator allocates said downlink traffic segment to said particular wireless terminal.

21. The apparatus as defined in claim 14 wherein in said at least one wireless terminal said transmits a traffic segment on said uplink wireless channel resource and said receiver receives an acknowledgment segment on said downlink wireless channel resource, and in said at least one wireless terminal said transmitter transmits an uplink traffic segment to said base station if said allocator allocates said uplink traffic segment to said particular wireless terminal.

22. Apparatus for a wireless communications system comprising at least one base station and at least one wireless terminal and which communicate via downlink and uplink wireless channel resources comprising:
    a partitioner to partition said wireless channel resources into at least an acknowledgment channel including one or more acknowledgment segments and a traffic channel including one or more traffic segments, and to associate each of said acknowledgment segments with said traffic segments in a fixed one-to-one manner;

a receiver for receiving traffic data in a traffic segment;

a detector for determining whether said received traffic data passes a prescribed error test; and a transmitter responsive to results of said error test for transmitting an acknowledgment in said acknowledgment segment associated on a one-to-one basis with said traffic segment that transported said traffic data, wherein said acknowledgment includes at least one logical bit of information indicating whether or not said error test was passed.

23. The apparatus as defined in claim 22 wherein said acknowledgment segments transport additional information relating to said associated traffic segments.

24. The apparatus as defined in claim 22 wherein said detector detects a logical state of said at least one logical bit of information to determine whether said traffic data has been successfully received, and said logical bit of information has a first logical state indicating that said traffic data has been successfully received and a second logical state indicating that said traffic data has not been successfully received.

25. The method as defined in claim 1 further includes the steps of determining from said at least one logical bit whether said received acknowledgment indicates that the traffic data needs to be retransmitted, and retransmitting said traffic data in said traffic segment when said determination so indicates.

26. The method as defined in claim 1 wherein in said base station said step of transmitting includes transmitting a traffic segment on said downlink wireless channel resource and said step of receiving includes receiving an acknowledgment segment on said uplink wireless channel resource.

27. The method as defined in claim 26 wherein said step of transmitting includes a step of dynamically allocating said downlink traffic segments to said active wireless terminals.

28. The method as defined in claim 1 wherein said acknowledgment does not include any sequence number associated with said traffic data transmitted in said traffic segment.

29. The method as defined in claim 1 wherein in said at least one wireless terminal said step of transmitting includes transmitting a traffic segment on said uplink wireless channel resource and said step of receiving includes receiving an acknowledgment segment on said downlink wireless channel resource.

30. The method as defined in claim 29 wherein said step of transmitting includes a step of dynamically allocating said uplink traffic segments to said wireless terminals.

31. The method as defined in claim 30 wherein a particular wireless terminal transmits an uplink traffic segment if said uplink traffic segment is allocated to said particular wireless terminal.

32. The method as defined in claim 25 wherein said base station transmits a downlink traffic segment to a particular wireless terminal if said downlink traffic segment is allocated to said particular wireless terminal.

33. The method as defined in claim 8 wherein any acknowledgement carried by said acknowledgement segment does not include any sequence number associated with said traffic data transmitted in said traffic segment.

34. The method as defined in claim 8 wherein in said at least one wireless terminal said step of receiving includes receiving a traffic segment on said downlink wireless channel resource and said step of transmitting includes transmitting an acknowledgment segment on said uplink wireless channel resource.

35. The method as defined in 34 wherein said uplink acknowledgment channel is common to all active wireless terminals and said step of receiving includes a step of dynamically allocating said downlink traffic segments to said wireless terminals.

36. The method as defined in claim 35 wherein a wireless terminal receives a downlink traffic segment from said base station and transmits to said base station an uplink acknowledgment segment associated with said downlink traffic segments, if said downlink traffic segment is allocated to said wireless terminal.

37. The method as defined in claim 8 wherein in said base station said step of receiving includes receiving a traffic segment on said uplink wireless resource and said step of transmitting includes transmitting an acknowledgment segment on said downlink wireless channel resource.

38. The method as defined in claim 37 wherein said downlink acknowledgment channel are common to all active wireless terminals and said step of receiving includes the step of dynamically allocating said uplink traffic segments to said wireless terminals.

39. The method as defined in claim 38 wherein said base station receives an uplink traffic segment from a particular wireless terminal and transmits to said particular wireless terminal a downlink acknowledgment segment associated with said uplink traffic segment, if said uplink traffic segment is allocated to said particular wireless terminal.

40. The method as defined in claim 8 wherein said acknowledgment consists of one logical bit.

41. The apparatus as defined in claim 19 wherein in said base station said transmitter is controlled to transmit a traffic segment on said downlink wireless channel resource and said receiver is controlled to receive an acknowledgment segment on said uplink wireless channel resource.

42. The apparatus as defined in claim 19 wherein said acknowledgment does not include any sequence number associated with said traffic data transmitted in said traffic segment.

43. The apparatus as defined in claim 19 wherein in said at least one wireless terminal said transmitter is controlled to transmit a traffic segment on said uplink wireless channel resource and said receiver is controlled to receive an acknowledgment segment on said downlink wireless channel resource.

44. The apparatus as defined in claim 43 wherein said transmitter is controlled to dynamically allocate said uplink traffic segments to said wireless terminals.

45. The apparatus as defined in claim 44 wherein said transmitter in a particular wireless terminal is controlled to transmit an uplink traffic segment if said uplink traffic segment is allocated to said particular wireless terminal.

46. The apparatus as defined in claim 41 wherein in said base station said transmitter transmits a downlink traffic segment to a particular wireless terminal if said downlink traffic segment is allocated to said particular wireless terminal.

47. The apparatus as defined in claim 22 wherein any acknowledgement carried by said acknowledgment segment does not include any sequence number associated with said traffic data transmitted in said traffic segment.

48. The apparatus as defined in claim 22 wherein in said base station said receiver is controlled to receive a traffic segment on said uplink wireless channel resource and said transmitter is controlled to transmit an acknowledgment segment on said downlink wireless channel resource, and wherein said downlink acknowledgment channel is common to all active wireless terminals and said receiver is further controlled to dynamically allocate said uplink traffic segments to said wireless terminals.

49. The apparatus as defined in claim 48 wherein said receiver in a particular wireless terminal is controlled to receive a downlink traffic segment from said base station and said transmitter in said particular wireless terminal is controlled to transmit an uplink acknowledgment segment associated with said downlink traffic segment, if said downlink traffic segment is allocated to said particular wireless terminal.

50. The apparatus as defined in claim 22 wherein in said at least one wireless terminal said receiver is controlled to receive a traffic segment on said downlink wireless channel resource and said transmitter is controlled to transmit an acknowledgment segment on said uplink wireless channel resource.

51. The method as defined in claim 50 wherein said unlink acknowledgment channel is common to all active wireless terminals and said receiver is controlled to dynamically allocate said downlink traffic segments to said active wireless terminals.

52. The method as defined in claim 22 wherein in said base station said receiver is controlled to receive an uplink traffic segment from a particular wireless terminal and said transmitter is controlled to transmit to said particular wireless terminal a downlink acknowledgment segment associated with said uplink traffic segment, if said uplink traffic segment is allocated to said particular wireless terminal.

53. The apparatus as defined in claim 14 wherein said acknowledgment consists of one logical bit.

54. The apparatus as defined in claim 22 wherein in said base station said receiver receives a traffic segment on said uplink wireless channel resource and said transmitter transmits an acknowledgment segment on said downlink wireless channel resource.

55. The apparatus as defined in 54 wherein said base station further includes an allocator for dynamically allocating said uplink traffic segments to said wireless terminals, and in said base station said receiver receives an uplink traffic segment from a particular wireless terminal if said allocator allocates said unlink traffic segment to said particular wireless terminal.

56. The apparatus as defined in claim 55 wherein said downlink acknowledgment channel is common to all active wireless terminals, and in said base station said transmitter transmits to a wireless terminal a downlink acknowledgment segment associated with said uplink traffic segment, if said unlink traffic segment is allocated to said wireless terminal.

57. The apparatus as defined in claim 22 wherein in said at least one wireless terminal said receiver receives a traffic segment on said downlink wireless channel resource and said transmitter transmits an acknowledgment segment on said uplink wireless channel resource.

58. The apparatus as defined in claim 57 wherein said base station further includes an allocator for dynamically allocating said downlink traffic segments to said wireless terminals, and in said wireless terminal said receiver receives a downlink traffic segment from said base station if said allocator allocates said downlink traffic segment to said particular wireless terminal.

59. The apparatus as defined in claim 58 wherein said uplink acknowledgment channel is common to all active wireless terminals, and in said wireless terminal said transmitter transmits to said base station an uplink acknowledgment segment associated with said downlink traffic segment, if said downlink traffic segment is allocated to said wireless terminal.

* * * * *